US012715163B2

(12) United States Patent
Vetter et al.

(10) Patent No.: US 12,715,163 B2
(45) Date of Patent: Aug. 25, 2026

(54) METHOD FOR THE PRODUCTION OF CELLULAR PLASTIC PARTICLES

(71) Applicant: FOX Velution GmbH, Burgbernheim (DE)

(72) Inventors: Jörg Vetter, Burgbernheim (DE); Mirjam Lucht, Burgbernheim (DE); Josua Schneider, Burgbernheim (DE)

(73) Assignee: FOX Velution GmbH (DE)

( * ) Notice: Subject to any disclaimer, the term of this patent is extended or adjusted under 35 U.S.C. 154(b) by 101 days.

(21) Appl. No.: 18/558,141

(22) PCT Filed: Apr. 25, 2022

(86) PCT No.: PCT/EP2022/060849

§ 371 (c)(1),
(2) Date: Oct. 30, 2023

(87) PCT Pub. No.: WO2022/229070

PCT Pub. Date: Nov. 3, 2022

(65) Prior Publication Data

US 2024/0227255 A1 Jul. 11, 2024

(30) Foreign Application Priority Data

Apr. 30, 2021 (DE) .......................... 102021111247.8

(51) Int. Cl.
*B29C 44/34* (2006.01)
*B29C 35/08* (2006.01)
(Continued)

(52) U.S. Cl.
CPC ...... *B29C 44/3461* (2013.01); *B29C 35/0805* (2013.01); *B29C 44/3415* (2013.01);
(Continued)

(58) Field of Classification Search
CPC ............ B29C 44/3461; B29C 44/3453; B29C 44/3446; B29C 44/3402; B29C 44/3415; B29C 2035/0822; B29C 35/0805
See application file for complete search history.

(56) References Cited

U.S. PATENT DOCUMENTS 3,015,479 A 1/1962 Edberg et al.
9,493,622 B2 11/2016 Yoshida
(Continued)

FOREIGN PATENT DOCUMENTS

DE 2834965 8/1978
DE 102013225132 6/2015
(Continued)

*Primary Examiner* — Stella K Yi
(74) *Attorney, Agent, or Firm* — Rimon PC

(57) ABSTRACT

A method for preparing cellular plastic particles comprising the steps:

Figure 2:
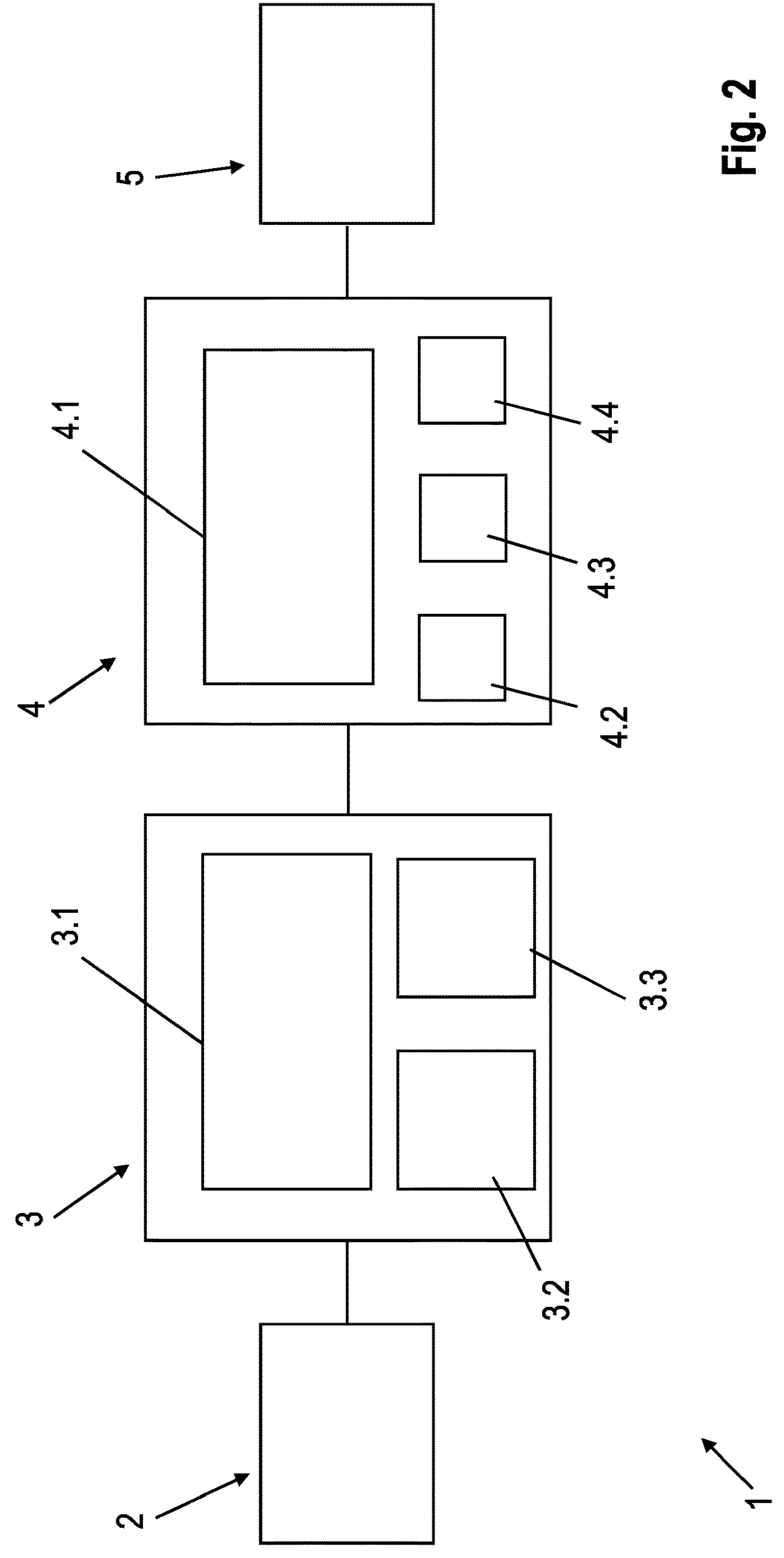

- providing a plastic material in the form of pre-expanded plastic material particles,
- loading of the pre-expanded plastic material particles with a blowing agent under the influence of pressure,
- expanding the pre-expanded plastic material particles loaded with a blowing agent for the production of cellular plastic particles, in particular cellular plastic particles with lower density, under the influence of temperature, wherein the expanding of the plastic material particles loaded with blowing agent under the influence of temperature is carried out by irradiating the plastic material particles loaded with blowing agent with high-energy thermal radiation, in particular infrared radiation.

20 Claims, 4 Drawing Sheets

(51) Int. Cl.
*B29K 105/00* (2006.01)
*B29K 105/04* (2006.01)

(52) U.S. Cl.
CPC .. *B29C 2035/0822* (2013.01); *B29K 2105/04* (2013.01); *B29K 2105/251* (2013.01)

(56) References Cited

U.S. PATENT DOCUMENTS

| | | | | |
|---|---|---|---|---|
| 2014/0259329 | A1* | 9/2014 | Watkins | B29C 37/0025 264/492 |
| 2014/0275306 | A1 | 9/2014 | Watkins et al. | |

FOREIGN PATENT DOCUMENTS

| | | |
|---|---|---|
| EP | 2733164 | 7/2012 |
| EP | 3393745 | 12/2016 |
| WO | 2001091983 | 12/2001 |
| WO | 2013181705 | 12/2013 |
| WO | 2015052265 | 4/2015 |
| WO | 2017030835 | 2/2017 |
| WO | 2018029040 | 2/2018 |
| WO | 2020174040 | 9/2020 |

* cited by examiner

Fig. 1
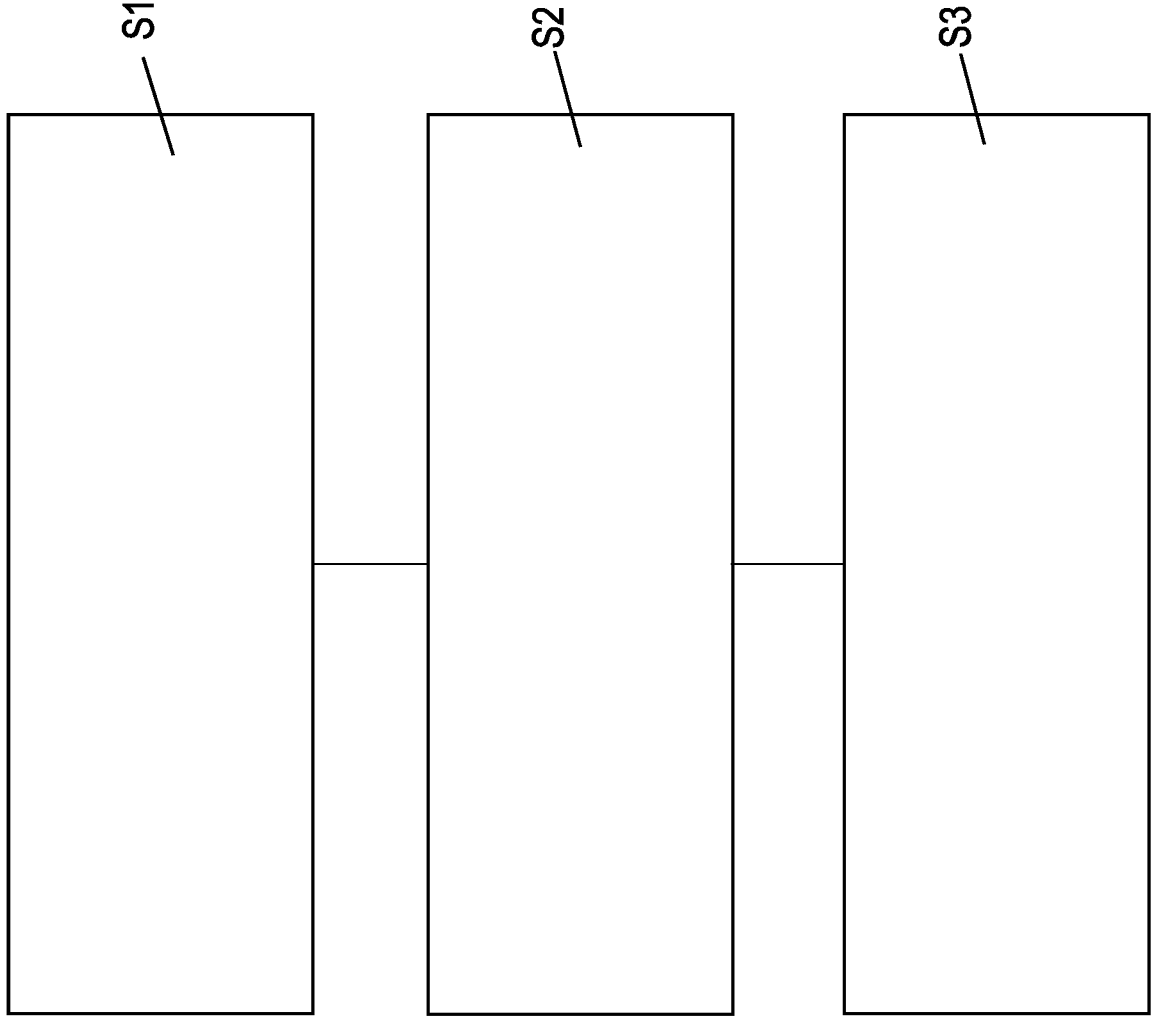
S1
S2
S3

Fig. 4
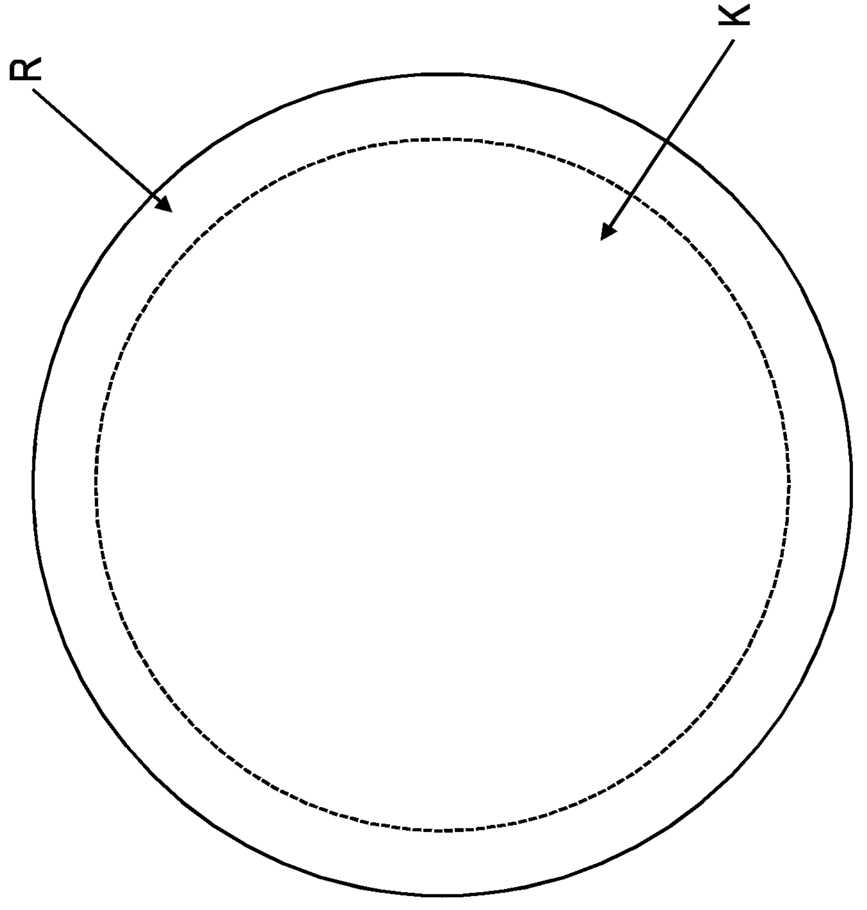
R
K

METHOD FOR THE PRODUCTION OF CELLULAR PLASTIC PARTICLES

The invention relates to a method for the production of cellular plastic particles.

Methods for the production of cellular plastic particles, which are further processed, in particular for the production of particle foam moldings, are basically known from the prior art.

Known methods for the production of cellular plastic particles are based on a two-stage process which, in a first stage, provides for melting a thermoplastic plastic material in an extruder and loading the thermoplastic plastic material melt thus produced within the extruder with a blowing agent and, in a second stage, for granulating or comminuting the thermoplastic plastic material which emerges from the extruder in strand form and expands or expands as a result of the blowing agent.

In the first stage of a corresponding process, the blowing agent is dissolved in the thermoplastic material melt due to the pressure and temperature conditions prevailing in the extruder. After the thermoplastic material loaded with blowing agent has left the extruder, the plastic material expands as a result of the pressure drop and the blowing agent is converted into the gas phase.

In the second stage of a corresponding process, the plastic material is granulated or comminuted, e.g. by means of a cutting device, as it emerges from the extruder in strand form and, as described, immediately expands after leaving the extruder due to the blowing agent, resulting in cellular plastic particles which can be further processed in a separate process to form a particle foam molding.

Known methods are comparatively complex in terms of both equipment and process technology. In addition, the cellular plastic particles that can be produced with known methods are in need of improvement with regard to properties such as size, morphology and distribution of the cells; the possibilities of influencing the corresponding properties of the cellular plastic particles in terms of equipment and process technology are clearly limited in known methods.

Furthermore, it is not possible with known methods to produce cellular plastic particles starting from a pre-expanded plastic material. This applies in particular because the extrusion-based process described damages or destroys the structure of the pre-expanded plastic material particles, especially due to the mechanical and thermal energy input.

This applies in particular to basically known autoclave processes in which pre-expanded plastic material particles are expanded batchwise and thus discontinuously into foam beads in an autoclave device (so-called post-foamer/foamer) using superheated steam. Improvements to this process include energy inefficiency, the infrastructural requirements for steam generation and supply, the risk of deterioration in the morphology of the foam beads produced over their entire volume, high scattering due to different thermal conditions in the various areas of the autoclave system, and the subsequent drying processes required to remove the moisture from the superheated steam.

On this basis, the present invention is based on the object of providing a method for the production of cellular plastic particles which is improved in comparison thereto and which, starting from pre-expanded plastic material particles, also enables the production of cellular plastic particles, in particular with specifically adjustable properties for subsequent processing into particle foam moldings and their application or use properties.

The object is achieved by means of a method according to claim 1. The claims dependent thereon relate to possible embodiments of the method.

A first aspect of the invention relates to a method for the production of cellular plastic particles; the method described herein is thus used for the production of cellular plastic particles in general. The plastic particles that can be manufactured or produced according to the method are thus plastic particles that have a cellular structure at least in sections, typically completely. The plastic particles can also have a certain (further) expansion capacity, in particular due to a certain content of blowing agent—be it a residue from the method described or one introduced subsequently in a separate method step. The cellular plastic particles that can be or are produced according to the method can thus be expandable and/or (mechanically) compressible or compressible due to their cellular structure. In all cases, the cellular plastic particles that can be produced or manufactured according to the method can be referred to or deemed to be "foam particles" or "foam beads". As will be seen further, the method can also be referred to or deemed to be a method for radiation-based modification, i.e. in particular for post-expansion or further expansion, of pre-expanded plastic particles. The radiation-based modification serves in particular for the targeted radiation-based influencing of the cellular properties and thus of the cellular structure of corresponding pre-expanded plastic particles, which, as mentioned, means in particular a post-expansion or further expansion.

The cellular plastic particles, which can also be referred to as "plastic particles" in the following, can be further processed into a particle foam molding in one or more independent downstream processes. The further processing of the cellular plastic particles into a particle foam molding can be carried out using steam or superheated steam (steam-based) or without the use of steam or superheated steam (non-steam-based or dry).

The steps of the method for the production of cellular plastic particles are explained in detail below.

In a first step of the method, a plastic material is provided in the form of pre-expanded plastic material particles. The pre-expanded plastic material particles provided in accordance with the method can also be referred to as "pre-expanded plastic particles", if appropriate. The plastic material to be considered as starting material, which is thus a particle foam material, thus already a cellular plastic material, is provided in the first step of the method in the form of pre-expanded plastic material particles. The pre-expanded plastic material provided is thus in particulate form, i.e. in particular in bulk form or shape. Accordingly, in the first step, generally at least one measure for providing a particulate, i.e., in particular bulk, pre-expanded plastic material in the form of corresponding pre-expanded plastic material particles is carried out. The density of the pre-expanded plastic material particles provided in the first step of the method is typically below 1 g/cm$^3$, in particular in a range between 0.05 and 2.2 g/cm$^3$, depending on the material composition or modification due to the cellular structure, from which the pre-expanded properties of the pre-expanded plastic material particles provided result; the matrix of the pre-expanded plastic material particles provided thus has a porous or cellular structure.

Despite their cellular structure, the matrix of the pre-expanded plastic material particles can optionally contain at least one additive or additive material, such as elongated, spherical or platelet-shaped fillers. In particular for pre-expanded plastic material particles with additives or additive materials, the density, depending on the concentration, can optionally also be above 1 g/cm$^3$. Corresponding additives or materials can themselves be present or act in a cellular form.

The first step of the method can be carried out, optionally at least partially automated or partially automated, by means of a supply device which is configured for the continuous or discontinuous supply of a corresponding plastic material in the form of pre-expanded plastic material particles. A corresponding supply device can be, for example, a conveyor device by means of which the pre-expanded plastic material particles to be processed into corresponding cellular plastic particles can be conveyed to or into a loading device performing the second step of the method. A corresponding conveyor device can, for example, be configured as or comprise a belt conveyor device or flow conveyor device. Conveying the pre-expanded plastic material particles to or into a loading device performing the second step of the method can thus include picking up the pre-expanded plastic material particles in a conveying flow; the pre-expanded plastic material particles can thus be conveyed by means of a conveying flow to or into a loading device performing the second step of the method.

In a second step of the method, the pre-expanded plastic material particles are loaded with a blowing agent at least under the influence of pressure. In the second step, the pre-expanded plastic material particles are thus loaded with a blowing agent at least under the influence of pressure—if necessary, a specific (increased) temperature can also be applied in addition to a specific pressure, depending on the material. In the second step, therefore, generally at least one measure for loading the pre-expanded plastic material particles with a blowing agent is carried out at least under the influence of pressure, i.e. at least pressurized. Phenomenologically, an enrichment of the blowing agent in the respective pre-expanded plastic material particles typically takes place in the second step of the method. The enrichment of the blowing agent in the respective pre-expanded plastic material particles can, in particular depending on the chemical configuration of the pre-expanded plastic material particles, the blowing agent as well as the additives or materials possibly contained therein as well as depending on the, as mentioned, typically also material-dependent selected pressure or temperature conditions, result, for example, from or through absorption and/or dissolution processes for the blowing agent in the respective pre-expanded plastic material particles. Due to the cellular structure of the pre-expanded plastic material particles, an accumulation of the blowing agent can also take place within the cellular spaces provided by the cellular structure; consequently, the inner volume of a respective pre-expanded plastic material defined by the cellular spaces can be used as a receiving space for the absorption of blowing agent taking place in the second step of the method.

The pressure level n of the second step of the method is typically selected, in particular depending on the material, in such a way that the cellular structure of the pre-expanded plastic material particles is not damaged; in particular, the pressure level in the second step of the method is selected in such a way that the cellular structure of the pre-expanded plastic material particles is not damaged in an undesirable way due to pressure, i.e., e.g., plastically deformed and even completely collapsed. In this context, the effective difference between external loading pressure and internal cellular pressure is of particular importance.

The same applies in particular to the rate of pressure rise, i.e. the speed at which the external pressure is increased from an initial level to a target level in the second step. Typically, the rate of pressure rise lies in a range between 0.001 bar per minute and 1000 bar per minute. In particular between 0.01 bar per minute and 1000 bar per minute, further in particular between 0.1 bar and 1000 bar per minute, further in particular between 1 bar and 1000 bar per minute, further in particular between 2, 3, 4, 5, 6, 7, 8, 9 or 10 bar and 1000 bar per minute, further in particular between 15, 20, 25, 30, 35, 40, 45, 50, 55, 60, 65, 70, 75, 89, 85, 90, 95 or 100 bar per minute and 1000 bar per minute, further in particular between 125, 150, 175, 200, 225, 250, 275, 300, 325, 350, 375, 400, 425, 450, 475, 500, 525, 550, 575, 600, 0625, 650, 675, 700, 735, 750, 775, 800, 825, 850, 875, 900, 0 925, 950 or 975 bar per minute and 1000 bar per minute. All intermediate values not explicitly listed here are also conceivable.

Gases, such as carbon dioxide or a mixture containing carbon dioxide and/or nitrogen, such as air, can be used as blowing agents. In general, any combustible or non-combustible organic gases, i.e., in particular, butane or pentane; or inert gases, such as noble gases, i.e., in particular, helium, neon, argon; or nitrogen, or mixtures thereof can be used. Accordingly, the term "blowing agent" can also include a mixture of chemically and/or physically different blowing agents. The choice of blowing agent is typically made taking into account its absorption capacity in the pre-expanded plastic material particles, thus taking into account the chemical and/or physical configuration or composition of the pre-expanded plastic material particles. If the pre-expanded plastic material particles contain additives or additive materials, the properties, such as the chemical and/or physical configuration of the additives or additive materials, can also be taken into account when selecting the blowing agent.

The second step of the method can be carried out, optionally at least partially automated or partially automated, by means of a loading device which is configured for loading the pre-expanded plastic material particles with a blowing agent at least under the influence of pressure or for carrying out a corresponding loading process. A corresponding loading device can, for example, be configured as an autoclave device, i.e. generally as a pressure vessel device comprising a pressure or process chamber, which can be temperature-controlled, or comprise such a pressure vessel device. A corresponding loading device can further comprise a temperature control device, which is configured for temperature control of a corresponding pressure or process chamber. In all cases, a corresponding loading device can comprise a control and/or regulation unit implemented in terms of hardware and/or software, which is configured for controlling and/or regulating, i.e. generally for setting, certain dynamic and/or static pressure and/or temperature parameters within a corresponding pressure or process chamber.

In a third step of the method, the pre-expanded plastic material particles loaded with blowing agent are expanded to produce cellular plastic particles under the influence of temperature, i.e. in particular elevated temperature. The pre-expanded plastic material particles loaded with blowing agent are thus typically exposed to elevated temperature, i.e. generally thermal energy, in the third step of the method, resulting in outgassing and/or expansion of the blowing agent contained in the pre-expanded plastic material particles. This typically takes place in a dry state, i.e. without the external influence of fluids such as steam or water. In particular, the outgassing of the blowing agent in the cells and the matrix regions of the thermally softened or softened pre-expanded plastic material particles causes the plastic material particles to expand again or further, which, after cooling or "freezing", leads to the formation of plastic particles with a permanent cellular structure, which can have changed compared to the starting material, for example with regard to the number of cells and/or shape and/or size, and thus to the formation of the cellular plastic particles to be produced. Accordingly, in the third step of the method, generally at least one measure is carried out for degassing or expanding the blowing agent contained in the cells and the matrix regions of the pre-expanded plastic material particles, which are softened or softened at least due to the influence of temperature and thus at least thermally, for the production of cellular plastic particles. Phenomenologically, in the third step of the method, in particular due to the outgassing or desorption of the blowing agent from the cells and the matrix regions of the softening or softened pre-expanded plastic material particles, a further cell growth and, if necessary, a renewed cell formation with subsequent cell growth within the pre-expanded plastic material particles take place, which leads to the cellular plastic particles to be produced, which in comparison to the pre-expanded plastic particles have a, if necessary, significantly lower density. Cell formation, if any, is typically based on the aforementioned desorption of the blowing agent at nucleation points in the plastic material particles softened or softened by the influence of temperature, while cell growth is typically based on an overpressure-induced expansion of the blowing agent in already formed or existing cells. As also mentioned, the cellular structure formed in this way, or the further expansion state realized with it, is permanently "frozen" or fixed by the or a temperature reduction of the cellular plastic particles produced in this way, i.e. by their cooling, e.g. in the environment.

Basically, after the pressurization in the second step of the method, i.e. after a pressure drop, in particular to normal or standard conditions, outgassing or desorption processes take place within the respective pre-expanded plastic material particles which are loaded with blowing agent and typically softened due to thermal conditions. The outgassing or desorption processes for the blowing agent represent an essential prerequisite for the cell growth processes and, if necessary, cell formation processes within respective plastic material particles required for the production of cellular plastic particles. The cellular plastic particles to be produced in accordance with the method are formed in the third step of the method from the pre-expanded plastic material particles present after the second step of the method, loaded with blowing agent and typically softened for thermal reasons, in particular as a result of corresponding outgassing or desorption processes.

As mentioned, the cellular plastic particles to be produced or produced according to the method have a lower density than the pre-expanded plastic particles, so that the method, as also mentioned, serves to produce cellular plastic particles of lower density and can thus also be designated or considered as a method for radiation-based modification, i.e. in particular for radiation-based post-expansion or further expansion, of pre-expanded plastic particles.

As will be explained further on, cellular structures with locally different cell properties and thus graded cellular plastic particles can be realized, if necessary, by controlling corresponding outgassing- or desorption-related cell formation and cell growth processes.

In general, cellular plastic particles with a cell size in the range between 0.5 and 250 μm can be produced. The actual cell size—of course an average is typically referred to here—can therefore be adjusted over a very wide range and thus tailored to the method, depending on the selected process conditions. The same applies to any distribution of cell sizes within the respective cellular plastic particles.

In particular, it applies that cellular plastic particles with a (mean) cell size below 250 μm, in particular below 240 μm, further in particular below 230 μm, further in particular below 220 μm, further in particular below 210 μm, further in particular below 200 μm, further in particular below 190 μm, further in particular below 180 μm, further in particular below 170 μm, further in particular below 160 μm, further in particular below 150 μm, further in particular below 140 μm, further in particular below 130 μm, further in particular below 120 μm, further in particular below 110 μm, further in particular below 100 μm, further in particular below 90 μm, further in particular below 80 μm, further in particular below 70 μm, further in particular below 60 μm, further in particular below 50 μm, further in particular below 45 μm, further in particular below 40 μm, further in particular below 35 μm, further in particular below 30 μm, further in particular below 25 μm, further in particular below 24 μm, further in particular below 23 μm, further in particular below 22 μm, further in particular below 21 μm, further in particular below 20 μm, further in particular below 19 μm, further in particular below 18 μm, further in particular below 17 μm, further in particular below 16 μm, further in particular below 15 μm, further in particular below 14 μm, further in particular below 13 μm, further in particular below 12 μm, further in particular below 11 μm, further in particular below 10 μm, or even smaller. All intermediate values not explicitly listed here are also conceivable.

The third step of the method can be carried out, optionally at least partially automated or partially automated, by means of an expansion device which is configured for radiation-based expansion of the blowing agent for the production of cellular plastic particles at least under the influence of temperature for carrying out a corresponding radiation-based expansion process. A corresponding expansion device is typically configured as or comprises a radiation-based heating device, i.e., generally a temperature control device comprising a temperature control or process chamber that can be temperature-controlled or temperature-controlled at least on the basis of radiation. A corresponding tempering device can further comprise a conveyor device, which is configured for conveying the plastic material particles to be expanded along a conveying path through a corresponding tempering or process chamber. In all cases, a corresponding expansion device can comprise a control and/or regulation unit implemented in terms of hardware and/or software, which is configured for controlling and/or regulating, i.e. generally for setting, certain dynamic and/or static conveying and/or temperature and/or radiation parameters within a corresponding temperature control or process chamber.

In particular, the third step of the method can be carried out continuously, if necessary, which is advantageous over the batchwise autoclave-based processes mentioned at the beginning.

The density of the cellular plastic particles produced in the third step of the method is typically significantly below the initial density of the pre-expanded plastic material particles provided in the first step, resulting in the cellular properties of the plastic material particles that can be produced or produced according to the method. The bulk density of the cellular plastic particles produced in the third step of the method is correspondingly significantly below the bulk density of the pre-expanded plastic material particles provided in the first step of the method.

The cellular plastic particles produced in the third step of the method are typically further expandable or re-expandable, as mentioned further above; this can represent an essential property for the described, in particular steam-based or non-steam-based, further processing of the cellular plastic particles for the production of particle foam moldings.

Compared to known methods, the method is characterized by a special dynamic process control, which requires a softening necessary for expansion but, in contrast to an extrusion process, no complete melting of a pre-expanded plastic material loaded with blowing agent and thus no pressure- and temperature-intensive loading of a plastic material melt with a blowing agent. The dynamic process control, i.e. in particular the rapid (volume) heating possible with it—in contrast to convective and conductive energy transport in steam-based post-foaming—is also important for good energy efficiency and the significantly finer cell morphology mentioned further below (due to the lack of time for cell mergers). The method is therefore associated with a comparatively (significantly) simplified equipment and process engineering effort for its implementation, as pre-expanded plastic material particles can be loaded with a blowing agent, and corresponding plastic material particles loaded with blowing agent can be converted into cellular plastic particles at least under the influence of temperature, in particular under the influence of temperature and pressure.

In addition, the properties of the cellular plastic particles that can be manufactured or produced according to the method are improved, in particular with regard to the number, size, shape and distribution of the cells, which results from the easily adjustable and very well controllable process conditions in the course of the loading that takes place in the second step of the method and in the course of the expanding that takes place in the third step of the method.

In contrast to the autoclave-based expansion processes described at the beginning, the method enables a continuous expansion method for corresponding pre-expanded plastic particles loaded with blowing agent, which does not require any subsequent drying due to the lack of hot steam.

The method thus enables a significantly extended process window that can be precisely set or controlled for each plastic material, which in principle makes it possible to produce cellular plastic particles with desired properties from any (thermoplastic) pre-expanded plastic material particles.

As indicated, the loading of the pre-expanded plastic material particles with a blowing agent can be carried out under the influence of pressure and temperature. The parameters that can thus be varied for loading the pre-expanded plastic material particles with blowing agent and, in the further course, for the specific setting of certain properties of the cellular plastic particles to be produced or produced, in particular depending on the material, are thus initially the pressure and temperature conditions prevailing in the second step of the method. Of course, the time, i.e. in particular the course and duration of the pressure and temperature conditions, in the second step of the method is also a parameter which has an influence on the loading of the pre-expanded plastic material particles with blowing agent, i.e. in particular the absorption of the blowing agent in the pre-expanded plastic material particles.

Specific parameters for carrying out the second step of the method are given below as examples:

The loading of the pre-expanded plastic material particles with the blowing agent or a blowing agent can, for example, in particular depending on the chemical composition of the pre-expanded plastic material particles and/or the blowing agent, at a pressure in a range between 1 and 200 bar, in particular in a range between 1 and 190 bar, further in particular in a range between 1 and 180 bar, further in particular in a range between 1 and 170 bar, further in particular in a range between 1 and 160 bar, further in particular in a range between 1 and 150 bar, further in particular in a range between 1 and 140 bar, further in particular in a range between 1 and 130 bar, further in particular in a range between 1 and 120 bar, further in particular in a range between 1 and 110 bar, further in particular in a range between 1 and 100 bar, further in particular in a range between 1 and 90 bar, further in particular in a range between 1 and 80 bar, further in particular in a range between 1 and 70 bar, further in particular in a range between 1 and 60 bar, further in particular in a range between 1 and 50 bar, further in particular in a range between 1 and 40 bar, further in particular in a range between 1 and 30 bar, further in particular in a range between 1 and 20 bar, further in particular in a range between 1 and 10 bar. Instead of 1 bar, 2, 3, 4, 5, 6, 7, 8, 9 or 10 bar can also be used as the lower limit. The pressures mentioned above, as mentioned, by way of example, refer in particular to pressures within a pressure or process chamber of a corresponding loading device during the execution of the second step of the method. All intermediate values not explicitly listed here are also conceivable.

As mentioned, the pressure level and in particular the rate of pressure increase in the second step of the method is thereby, in particular material-dependent, typically selected in such a way that the cellular structure of the pre-expanded plastic material particles is not damaged; in particular, the pressure level and in particular the rate of pressure increase in the second step of the method are selected in such a way that the cellular structure of the pre-expanded plastic material particles does not plastically deform due to pressure (effective difference between external loading pressure and internal cellular pressure) and possibly even collapses.

The loading of the pre-expanded plastic material particles with the or a blowing agent can, for example, in particular depending on the chemical composition of the pre-expanded plastic material particles and/or the blowing agent, at a temperature in a range between 0 and 250° C., further in particular in a range between 0 and 240° C., further in particular in a range between 0 and 230° C., further in particular in a range between 0 and 220° C., further in particular in a range between 0 and 210° C., further in particular in a range between 0 and 200° C., further in particular in a range between 0 and 190° C., further in particular in a range between 0 and 180° C., further in particular in a range between 0 and 170° C., further in particular in a range between 0 and 160° C., further in particular in a range between 0 and 150° C., further in particular in a range between 0 and 140° C., further in particular in a range between 0 and 130° C., further in particular in a range between 0 and 120° C., further in particular in a range between 0 and 110° ° C., further in particular in a range between 0 and 100° C., further in particular in a range between 0 and 90° C., further in particular in a range between 0 and 80° C., further in particular in a range between 0 and 70° C., further in particular in a range between 0 and 60° C., further in particular in a range between 0 and 50° C., further in particular in a range between 0 and 40° C., further in particular in a range between 0 and 30° C., further in particular in a range between 0 and 20° C. The temperatures mentioned above, as mentioned, by way of example, refer in particular to temperatures within a pressure or process chamber of a corresponding loading device during the execution of the second step of the method. All intermediate values not explicitly listed here are also conceivable.

The loading of the pre-expanded plastic material particles with the blowing agent or a blowing agent can, for example, in particular depending on the chemical composition of the pre-expanded plastic material particles and/or the blowing agent, for a period of time in a range between 0.1 and 1000 h, in particular in a range between 0.1 and 950 h, further in particular in a range between 0.1 and 900 h, further in particular in a range between 0.1 and 850 h, further in particular in a range between 0.1 and 800 h, further in a range between 0.1 and 750 h, further in a range between 0.1 and 750 h, further in a range between 0.1 and 750 h, further in a range between 0.1 and 750 h, further in particular in a range between 0.1 and 750 h, further in particular in a range between 0.1 and 700 h, further in particular in a range between 0.1 and 650 h, further in particular in a range between 0.1 and 600 h, further in particular in a range between 0.1 and 550 h, further in particular in a range between 0.1 and 500 h, further in particular in a range between 0.1 and 450 h, further in particular in a range between 0.1 and 400 h, further in particular in a range between 0.1 and 350 h, further in particular in a range between 0.1 and 300 h, further in particular in a range between 0.1 and 250 h, further in particular in a range between 0.1 and 200 h, further in particular in a range between 0.1 and 150 h, further in particular in a range between 0.1 and 100 h, in particular in a range between 0.1 and 90 h, in particular in a range between 0.1 and 80 h, in particular in a range between 0.1 and 70 h, in particular in a range between 0.1 and 60 h, in particular in a range between 0.1 and 50 h, in particular in a range between 0.1 and 40 h, in particular in a range between 0.1 and 30 h, in particular in a range between 0.1 and 20 h, in particular in a range between 0.1 and 10 h, can be carried out. The above-mentioned, as mentioned, exemplary durations refer in particular to the application of pressure or temperature to the plastic material particles within a pressure or process chamber of a corresponding loading device during the execution of the second step of the method. All intermediate values not explicitly listed here are also conceivable.

Concrete parameters for carrying out the third step of the method are given below as examples:

Expanding the plastic material particles loaded with blowing agent to produce the cellular plastic particles under the influence of temperature, in particular depending on the chemical composition of the plastic particle material loaded with blowing agent and/or the blowing agent, can be carried out, for example, at normal pressure, i.e. an ambient pressure of about 1 bar. A special pressure level, such as a positive or negative pressure level, is therefore possible for expanding the pre-expanded plastic material particles loaded with blowing agent to produce the cellular plastic particles, but is not absolutely necessary, which fundamentally simplifies the expansion process.

Expanding the plastic material particles loaded with blowing agent to produce the cellular plastic particles under the influence of temperature can, for example, in particular depending on the chemical composition of the plastic particle material loaded with blowing agent and/or the blowing agent, at a temperature in a range between 20 and 300° C., in particular in a range between 20 and 290° C., further in particular in a range between 20 and 280° C., further in particular in a range between 20 and 270°, further in particular in a range between 20 and 260° C., further in particular in a range between 20 and 250° C., further in particular in a range between 20 and 240° C., further in particular in a range between 20 and 230° C., further in particular in a range between 20 and 220° C., further in particular in a range between 20 and 210° C., further in particular in a range between 20 and 200° ° C., further in particular in a range between 20 and 190° C., further in particular in a range between 20 and 180° C., further in particular in a range between 20 and 170° C., further in particular in a range between 20 and 160° C., further in particular in a range between 20 and 150° C., further in particular in a range between 20 and 140° C., further in particular in a range between 20 and 130° C., further in particular in a range between 20 and 120° C., further in particular in a range between 20 and 110° C., further in particular in a range between 20 and 100° C., further in particular in a range between 20 and 90° C., further in particular in a range between 20 and 80° C., further in particular in a range between 20 and 70° C., further in particular in a range between 20 and 60° C., further in particular in a range between 20 and 50° C., further in particular in a range between 20 and 40° C., further in particular in a range between 20 and 30° ° C. All intermediate values not explicitly listed here are also conceivable.

In particular, the above temperatures can refer to an inlet temperature when the pre-expanded plastic material particles loaded with blowing agent enter a corresponding expansion device and/or to an outlet temperature when the cellular plastic particles exit a corresponding expansion device. Corresponding inlet and outlet temperatures can be the same, similar or different. Provided that a corresponding expansion device comprises a conveyor device, which is arranged to convey the plastic material particles loaded with blowing agent along corresponding tempering devices, the aforementioned temperatures can refer to a temperature upon entry of the pre-expanded plastic particle material loaded with blowing agent into a corresponding expansion or tempering device (entry temperature). temperature (inlet temperature), i.e. to an initial area of a corresponding conveyor device, and/or to an outlet temperature when the plastic particles leave a corresponding expansion or temperature control device (outlet temperature), i.e. to an end area of a corresponding conveyor device. Typically, the inlet temperature is lower than the outlet temperature.

The expansion of the pre-expanded plastic material particles loaded with blowing agent under the influence of temperature takes place by irradiating the pre-expanded plastic material particles loaded with blowing agent with high-energy thermal radiation, i.e. in particular infrared radiation. In particular, infrared radiation with wavelengths in a range between 1 and 15 μm, in particular between 1.4 and 8 μm, further in particular between 1.4 and 3 μm, comes into consideration. The wavelengths of the infrared radiation are typically selected depending on the material. The temperature control, i.e. in particular the heating, of the pre-expanded plastic material particles loaded with blowing agent can be carried out in a very targeted manner, in particular depending on the material, by selecting and/or adjusting the properties of the high-energy radiation used, i.e. in particular its wavelength. In particular, the wavelength of the energy-rich radiation used can be adjusted in a very targeted manner without risking undesirable melting or through-melting, i.e. insufficient stability of the softened plastic material particles, in the event of softening of the pre-expanded plastic material particles associated with heating of the plastic material particles loaded with blowing agent. Investigations have shown that infrared radiation is particularly suitable for this purpose, as it enables targeted and, in conjunction with a conveyor device, easily controllable volume heating of the pre-expanded plastic material particles loaded with blowing agent, a controllable softening process and thus—this is essential for adjusting the properties of the cellular plastic particles to be produced—a controllable expansion process.

In particular, the expansion of the plastic material particles loaded with blowing agent can be effected under the influence of temperature by irradiating the pre-expanded plastic material particles loaded with a blowing agent with high-energy thermal radiation, in particular infrared radiation, wherein the plastic material particles loaded with blowing agent are conveyed on at least one conveying path defined by a conveyor device, in particular continuously, along at least one corresponding high-energy radiation, i.e. in particular infrared radiation, generating radiation generating device. A corresponding radiation generating device can in particular be configured as or comprise an infrared oven, in particular a continuous infrared oven. A corresponding infrared oven can comprise one or more infrared emitters arranged or formed along a corresponding conveying path. Corresponding infrared emitters can, for example, have a radiation power, which can be variable, in a range between 1 and 500 kW, further in particular in a range between 1 and 450 KW, further in particular in a range between 1 and 400 kW, further in particular in a range between 1 and 350 KW, further in particular in a range between 1 and 250 KW, further in particular in a range between 1 and 200 kW, further in particular in a range between 1 and 150 KW, further in particular in a range between 1 and 100 KW, further in particular in a range between 1 and 50 kW. Instead of 1 KW, 2, 3, 4, 5, 6, 7, 8, 9 or 10 KW can also be used as a lower limit. All intermediate values not explicitly listed here are also conceivable.

The aforementioned outputs can refer in particular to area output per $m^2$. Investigations have shown that area outputs between 5 and 100 $KW/m^2$ in particular deliver good results. Variable radiators or variable radiator (area) outputs can be used to generate different temperature zones, which also provides a parameter for influencing the expansion process.

According to the method, after the expansion of the plastic material particles loaded with blowing agent for the production of the cellular plastic particles, cooling of the produced cellular plastic particles can be carried out under the influence of a temperature (in particular lower than that of the previous expansion process), as indicated above. The cooling, which is expediently carried out rapidly, can result in a “freezing” of the cellular structure of the cellular plastic particles after the expansion process. In this way, further, integral or even only local expansion of the plastic particles, which can be undesirable after the expansion process, can be specifically prevented, for example in order to retain a cellular structure of the plastic particles which can be desired after the expansion process. In particular, cooling can be carried out from a process temperature above a reference temperature, in particular room temperature can be used as a reference temperature, to a cooling temperature below the method or reference temperature, in particular room temperature. Separate tempering devices for cooling the plastic particles are therefore not absolutely necessary, but it can be sufficient if the plastic particles are cooled to room temperature or aged at room temperature after the expansion process.

According to the method, as also indicated above, a pre-expanded plastic particle material containing at least one, in particular functional, additive or additive material, for example a fibrous substance or material and/or a dye or material and/or a nucleating substance or material and/or a substance or material, such as additives for adapting a melt viscosity, e.g. chain extenders, or for increasing the absorption coefficient, such as graphite, carbon black, etc., can be provided or used, can be provided or used to specifically influence or control the softening behavior of the plastic material particles loaded with blowing agent and containing pre-expanded plastic particle material. Accordingly, compounded and pre-expanded plastic material particles can also be loaded with blowing agent and expanded, resulting in cellular plastic particles with special properties. In particular, tailor-made plastic particles can be produced for specific applications or fields of application through a targeted selection and concentration of appropriate additives or materials. The additives or materials can have been introduced into the pre-expanded plastic material particles during their manufacture.

Particularly by means of fibrous substances or materials—which can basically be organic or inorganic fibrous substances or materials, e.g. aramid, glass, carbon or natural fibers—special material properties of the cellular plastic particles that can be or are produced according to the method or of a molded particle foam part produced from the cellular plastic particles that can be or are produced according to the method can be realized with regard to further processing. Corresponding cellular plastic particles or particle foam moldings produced from these can be characterized on the one hand by a special density due to their cellular structure and on the other hand in particular by special mechanical properties due to mechanical connections of adjacent cells within respective cellular plastic particles and/or between respective adjacent cellular plastic particles resulting from processing. During subsequent processing into particle foam moldings, these special mechanical properties can be utilized locally or integrally or can be further modified. The same applies—basically irrespective of their chemical composition—to non-fibrous or -shaped additives or additive materials, such as spherical or -shaped or platelet-like or -shaped organic and/or inorganic additives or additive materials.

In addition to specifically influencing the mechanical properties of the plastic particles, it is also possible, for example, to specifically influence the electrical properties and/or the thermal properties of the plastic particles by means of appropriate additives or materials. Thus, plastic particles with special electrically and/or thermally conductive properties can be produced, for example by means of electrically and/or thermally conductive additives or materials, such as metal and/or carbon black particles, etc.

The concentration of corresponding additives or additive materials can in principle be freely selected, although typically depending on the material. Thus, it is merely indicated by way of example that pre-expanded plastic material particles with one (or more) additive(s) or additive material(s) can be provided or used in a (respective) concentration between 0.01% by weight, this applies in particular to chemically active additives, and 60% by weight, this applies in particular to fibrous additives. As indicated, the concentration typically depends on the specific chemical and/or physical properties of the additives or additive materials or their combination.

It was mentioned that, in principle, any thermoplastic material can be provided or used as starting material. By way of example only, it is to be understood that pre-expanded plastic material particles from the group: Acrylonitrile-butadiene-styrene, Acrylonitrile-butadiene-styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polyvinyl chloride, polystyrene blend, thermoplastic elastomer blend. can be used. Blends or co-polymers or mixtures of different thermoplastic materials can also be used; modified PPE (mPPE) is merely mentioned as an example in this context.

If blends are used which contain at least two components differing in at least one chemical and/or physical parameter and/or parameter relating to the molecular configuration, these can in principle be present in any desired proportionate compositions, the respective proportions adding up to 100% by weight. Accordingly, a first constituent can have any proportion by weight between 1 and 99% by weight and a second constituent can have any proportion by weight between 99 and 1% by weight, the respective proportions adding up to 100% by weight. Of course, proportions below 1 wt. % and above 99 wt. % are also conceivable.

All plastic materials used can, as mentioned, be provided with one or more additives, such as fibers. All plastic materials used can be recyclates or contain a proportion of recyclates.

It was mentioned that the properties of the cellular plastic particles of lower density that can be produced or manufactured according to the method can be influenced in particular by the method conditions during the loading process and the expansion process.

According to the method, cellular plastic particles with a uniformly or non-uniformly distributed cellular structure can be produced, depending on the selected process conditions. The properties, i.e. in particular the distribution of the cellular structure, within the respective cellular plastic particles can therefore (also) be influenced by pressure, temperature and time during loading or expanding as well as by the conveying or residence times or conditions between the individual method steps, in addition to material-specific parameters.

If cellular plastic particles with an unevenly distributed cellular structure are produced according to the method, the respective cellular plastic particles can have a different number, shape and/or size of cells in a peripheral region than in a core region. Graded cellular plastic particles can therefore be produced which have a special range of properties due to the different distribution of cell number, cell shape and/or cell size. Graded cellular plastic particles can therefore, for example in the manner of core-shell particles, have different cellular properties in an (outer) peripheral region than in an (inner) core region.

Correspondingly configured cellular plastic particles can be achieved in particular by (too) short loading of the compact starting material with blowing agent, which then only accumulates close to the periphery, so that expansion then takes place, especially at the periphery. Conversely, an (excessively) long ageing period between blowing agent loading and expansion can lead to cellular plastic particles in which predominantly the “core” is foamed.

In general, cellular plastic particles with a cell size in the range between 0.5 and 250 μm can be produced. The actual cell size—of course an average is typically referred to here—can therefore be adjusted over a very wide range and thus tailored to the method, depending on the selected process conditions. The same applies to any distribution of the cell size within the respective cellular plastic particles.

In general, it is also true that, depending in particular on the degree of expansion and, where appropriate, the filler content, cellular plastic particles with a bulk density in a range between 5 and 1500 g/l can be produced by the method. The actual bulk density—here, too, of course, an average is typically referred to—can thus be adjusted over a very wide range and thus tailor-made, depending on the selected process conditions.

The following is a purely exemplary list of pre-expanded plastic material particles that can be specifically processed or have been processed as part of the method, as well as associated parameters for carrying out the second and third steps of the method:

In a first example, a pre-expanded polycarbonate plastic material, i.e. plastic material particles of polycarbonate, with a bulk density of approx. 140 g/l was provided in the first step of the method. The pre-expanded plastic material particles were loaded without separate tempering in the second step of the method in a pressure vessel at a pressure of about 40 bar for a period of 10 h with air as blowing agent. The rate of pressure rise was about 10 bar per hour. In the third step of the method, the plastic material particles loaded with blowing agent were expanded by conveying, in particular continuously or discontinuously, the pre-expanded plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 10 KW. The temperature of the conveyor belt at the inlet of the conveyor section was approx. 80° C., the temperature of the conveyor belt at the outlet of the conveyor or temperature control section was approx. 160° C. The conveying speed was about 700 mm/s. The cellular plastic particles produced in this way had a bulk density of approx. 115 g/l.

In a second example, in the first step of the method, a pre-expanded expandable polyamide plastic material, i.e. plastic material particles of an expandable polyamide, with a bulk density of about 420 g/l was provided. The pre-expanded plastic material particles were loaded without separate tempering in the second step of the method in a pressure vessel at a pressure of about 8 bar for a period of 40 h with air as blowing agent. The rate of pressure rise was about 1 bar per hour. In the third step of the method, the plastic material particles loaded with blowing agent were expanded by conveying, in particular continuously or discontinuously, the pre-expanded plastic material particles loaded with blowing agent through an infrared continuous furnace comprising a plurality of infrared emitters, i.e. by conveying the plastic material particles along a conveying or tempering section of a length of about 5 m formed by a plurality of tempering elements in the form of infrared emitters with a total emitter power of about 10 KW. The temperature of the conveyor belt at the inlet of the conveyor section was approx. 90° C., the temperature of the conveyor belt at the outlet of the conveyor/tempering section was approx. 220° C. The conveying speed was about 450 mm/s. The cellular plastic particles produced in this way had a bulk density of approx. 225 g/l.

In a third example, a pre-expanded expandable polypropylene plastic material, i.e. plastic material particles of polypropylene, with a bulk density of about 75 g/l was provided in the first step of the method. The pre-expanded plastic material particles were loaded without separate tempering in the second step of the method in a pressure vessel at a pressure of about 8 bar for a period of 100 h with air as blowing agent. The rate of pressure rise was about 0.2 bar per hour. In the third step of the method, the plastic material particles loaded with blowing agent were expanded by conveying, in particular continuously or discontinuously, the pre-expanded plastic material particles loaded with blowing agent through an infrared continuous furnace comprising several infrared emitters, i.e. by conveying the plastic material particles along a conveying or tempering section of a length of about 5 m formed by a plurality of tempering elements in the form of infrared emitters with a total emitter power of about 20 KW. The temperature of the conveyor belt at the inlet of the conveyor section was approx. 85° C., the temperature of the conveyor belt at the outlet of the conveyor or temperature control section was approx. 160° C. The conveying speed was about 450 mm/s. The cellular plastic particles produced in this way had a bulk density of approx. 35 g/l.

A second aspect of the invention relates to a particulate foam material formed by or comprising cellular plastic particles produced according to the method for the first aspect.

A third aspect of the invention relates a method for processing a plastic particulate material according to the second aspect to produce a particulate foam molding.

A fourth aspect relates to an apparatus for the production of cellular plastic particles, in particular according to a method according to the first aspect, comprising:

- a first device which is configured for loading the pre-expanded thermoplastic with a blowing agent under the influence of pressure, the device comprising in particular a loading device, e.g. in the form of a pressure vessel device; and
- a second device which is configured for expanding the blowing agent for the production of cellular plastic particles under the influence of temperature, the second device comprising in particular an expansion device in the form of a radiation generating device for generating high-energy radiation, in particular infrared radiation.

Accordingly, the second device can be configured in particular as a radiation-based heating device or comprise such a heating device.

The second device can comprise a conveyor device, in particular a combined conveying and temperature control device. A corresponding combined conveying and temperature control device can, for example, be configured as a continuous furnace, in particular as an infrared continuous furnace comprising one or more infrared emitters, or can comprise at least one such furnace.

The second device can also be assigned a stress-relieving device, such as a stress-relieving chamber, in which the manufactured cellular plastic particles are stored (stress-relieved) under defined chemical and/or physical conditions, i.e. in particular defined temperature ratios, for a defined time. A corresponding stress-relieving device can, for example, be configured as a decompression device or comprise such a device.

It is conceivable that the apparatus further comprises the or a conveyor device, by means of which the produced cellular plastic particles are conveyed continuously or discontinuously through a corresponding relaxation space.

The apparatus can further comprise suitable handling devices for handling the pre-expanded plastic material particles for providing them and/or for removing the produced cellular plastic particles. Corresponding handling devices can also be configured as or comprise conveyor devices. In particular, conveyor devices suitable for conveying bulk material, such as pneumatic conveyor devices, which are configured to form a conveying flow, are considered.

The apparatus can basically comprise a conveyor device by means of which the pre-expanded plastic material particles or, further on, the cellular plastic particles can be conveyed continuously or discontinuously through the individual devices of the apparatus.

All embodiments relating to the method according to the first aspect apply analogously to the particulate foam material according to the second aspect, the method according to the third aspect, and the apparatus according to the fourth aspect.

Figure 3:
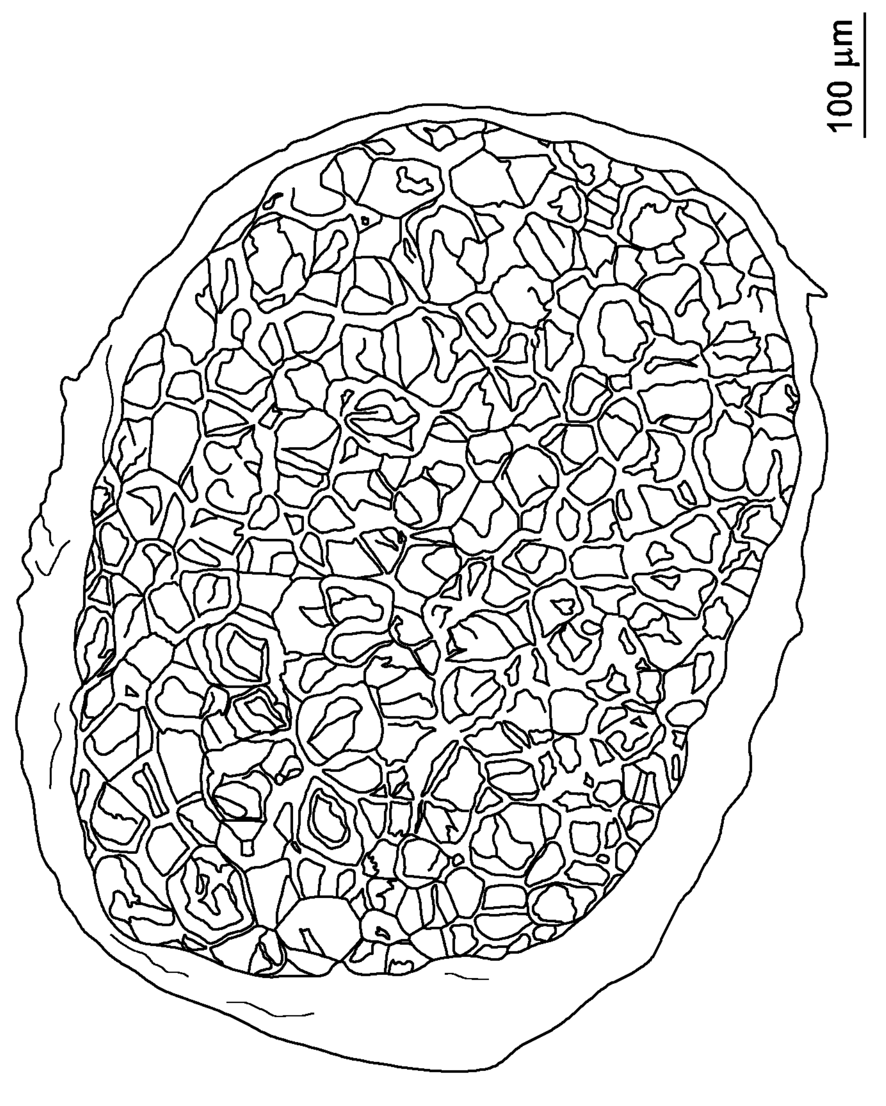

The invention is explained again in the following by way of examples of embodiments with reference to Fig. The Figures show in:

FIG. 1 a flowchart illustrating a method according to an embodiment;

FIG. 2 a principle representation of an apparatus for carrying out a method according to an embodiment; and FIGS. 3, 4 each a principle representation of a cellular plastic particle produced according to the method in accordance with an embodiment example.

FIG. 1 shows a flowchart illustrating a method according to an embodiment.

The method is a method for the production of cellular plastic particles; the method is thus used for the production of cellular plastic particles. The plastic particles which can be produced or which are produced in accordance with the method and which have a lower density than the starting material are therefore plastic particles which have a cellular structure at least in sections, and optionally completely. The plastic particles can also have a certain (further) expansion capacity, in particular due to a certain content of blowing agent—be it a residue from the method described or one introduced subsequently in a separate method step. The cellular plastic particles density that can be produced or manufactured according to the method can thus be expandable and/or (mechanically) compressible or compressible.

The cellular plastic particles with lower density that can be produced or manufactured according to the method can be further processed in one or more independent downstream processes to form a particle foam molding. The further processing of the plastic particles into a particle foam molded part can be carried out using steam or superheated steam (steam-based) or without the use of steam or superheated steam (non-steam-based or dry).

The steps of the method for the production of cellular plastic particle density are explained in more detail below with reference to FIGS. 1 and 2.

In a first step S1 of the method, a plastic material is provided in the form of pre-expanded plastic material particles. The provided pre-expanded plastic material particles can optionally also be referred to as "pre-expanded plastic material particles". The pre-expanded plastic material particles to be considered as starting material, which are typically thermoplastic plastic material particles, are thus provided in the first step of the method. The prepared starting material is thus present in particulate form, i.e. in particular in bulk form or shape. Accordingly, in the first step, generally at least one measure for providing a particulate, i.e. in particular bulk-like or -shaped, (thermoplastic) plastic material in the form of corresponding pre-expanded plastic material particles is carried out. The density of the pre-expanded plastic material particles provided in the first step of the method is typically below 1 g/cm$^3$, in particular in a range between 0.05 and 2.2 g/cm$^3$, depending on the material composition or modification due to the cellular structure, from which the pre-expanded properties of the pre-expanded plastic material particles provided result; the matrix of the pre-expanded plastic material particles provided thus has a porous or cellular structure.

Despite their cellular structure, the matrix of the pre-expanded plastic material particles can optionally contain at least one additive or additive material, such as elongated, spherical or platelet-shaped fillers. In particular for pre-expanded plastic material particles with additives or additive materials, the density, depending on the concentration, can optionally also be above 1 g/cm$^3$. Corresponding additives or materials can themselves be present or act in a cellular form.

The first step S1 of the method can be carried out, if necessary, at least partially automated or partially automated, by means of a supply device 2 shown purely schematically in FIG. 2, which is configured for the continuous or discontinuous supply of corresponding pre-expanded plastic material particles. A corresponding supply device 2 can, for example, be a conveyor device by means of which the pre-expanded plastic material particles to be processed into corresponding cellular plastic particles can be conveyed to or into a loading device 3 carrying out the second step of the method. A corresponding conveyor device can, for example, be configured as or comprise a belt conveyor device or flow conveyor device. Conveying the pre-expanded plastic material particles to or into a loading device 3 carrying out the second step of the method can therefore involve picking up the pre-expanded plastic material particles in a conveying flow; the pre-expanded plastic material particles can therefore be conveyed by means of a conveying flow to or into a loading device 3 carrying out the second step of the method.

In a second step S2 of the method, the pre-expanded plastic material particles are loaded with a blowing agent at least under the influence of pressure. In the second step, the pre-expanded plastic material particles are thus loaded with a blowing agent at least under the influence of pressure—if necessary, depending on the material, a specific (increased) temperature can also be applied in addition to a specific pressure. In the second step, therefore, generally at least one measure for loading the pre-expanded plastic material particles with a blowing agent is carried out at least under the influence of pressure, i.e. at least under the influence of pressure. Phenomenologically, an enrichment of the blowing agent in the respective pre-expanded plastic material particles typically takes place in the second step of the method. The enrichment of the blowing agent in the respective pre-expanded plastic material particles can, in particular depending on the chemical configuration of the pre-expanded plastic material particles, the blowing agent as well as the additives or materials possibly contained therein as well as depending on the, as mentioned, typically also material-dependent selected pressure or temperature conditions, result, for example, from or through absorption and/or dissolution processes for the blowing agent in the respective pre-expanded plastic material particles. Due to the cellular structure of the pre-expanded plastic material particles, an accumulation of the blowing agent can also take place within the cellular spaces provided by the cellular structure; consequently, the inner volume of a respective pre-expanded plastic material defined by the cellular spaces can be used as a receiving space for the absorption of blowing agent taking place in the second step of the method.

The pressure level and the rate of pressure increase in the second step of the method are thereby typically selected, in particular depending on the material, in such a way that the cellular structure of the pre-expanded plastic material particles is not damaged; in particular, the pressure level and the rate of pressure increase in the second step of the method are selected in such a way that the cellular structure of the pre-expanded plastic material particles is not plastically deformed and even collapses due to pressure (effective difference between external loading pressure and internal cellular pressure).

Gases, such as carbon dioxide or a mixture containing carbon dioxide and/or nitrogen, such as air, can be used as blowing agents. In general, any combustible or non-combustible organic gases, i.e. in particular butane or pentane; or inert gases, such as noble gases i.e. in particular helium, neon, argon; or nitrogen, or mixtures thereof can be used. The term "blowing agent" can therefore also include a mixture of chemically and/or physically different blowing agents. The choice of blowing agent is typically made taking into account its absorption capacity in the pre-expanded plastic material particles, thus taking into account the chemical and/or physical configuration or composition of the pre-expanded plastic material particles. If the pre-expanded plastic material particles contain additives or additive materials, the properties, such as the chemical and/or physical configuration of the additives or additive materials, can also be taken into account when selecting the blowing agent.

The second step S2 of the method can be carried out, if necessary, at least partially automated or partially automated, by means of a loading device 3 shown purely schematically in FIG. 2, which is configured for loading the pre-expanded plastic material particles with a blowing agent at least under the influence of pressure or for carrying out a corresponding loading process. A corresponding loading device 3 can, for example, be configured as an autoclave device, i.e. generally as a pressure vessel device 3.1 comprising a pressure or process chamber, or comprise such a pressure vessel device. A corresponding loading device 3 can further comprise a temperature control device 3.2, which is configured for temperature control of a corresponding pressure or process chamber. A corresponding loading device can in all cases comprise a control and/or regulating unit 3.3 implemented in hardware and/or software, which is configured for controlling and/or regulating, i.e. generally for setting, certain dynamic and/or static pressure and/or temperature parameters within the pressure or process chamber.

In a third step of the method, the pre-expanded plastic material particles loaded with blowing agent are expanded to produce cellular plastic particles under the influence of temperature, i.e. in particular elevated temperature. Thus, in the third step of the method, the pre-expanded plastic material particles loaded with blowing agent are typically exposed to (elevated) temperature, i.e. generally thermal energy, resulting in outgassing and/or expansion of the blowing agent contained in the pre-expanded plastic material particles. In particular, the outgassing of the blowing agent in the cells and the matrix regions of the thermally conditionally softened or softened pre-expanded plastic material particles causes a renewed or further expansion of the plastic material particles, which after cooling or "freezing" leads to the formation of plastic particles with a permanent cellular structure, which can have changed compared to the starting material, for example with respect to cell number, cell shape and/or cell size, and thus to the formation of the cellular plastic particles to be produced.

Accordingly, in the third step of the method, generally at least one measure is carried out for outgassing or expanding the blowing agent contained in the pre-expanded plastic material particles softening or softening at least due to the influence of temperature and thus at least thermally, for the production of cellular plastic particles. Phenomenologically, in the third step of the method, in particular due to the outgassing or desorption of the blowing agent from the cells and the matrix regions of the softening or softened pre-expanded plastic material particles, a, possibly further, cell growth takes place as well as possibly a renewed cell formation with subsequent cell growth within the pre-expanded plastic material particles, which leads to the cellular plastic particles to be produced. The cell formation, if any, is typically based on the aforementioned desorption of the blowing agent at nucleation points in the plastic material particles softening or softened by temperature influence, while the cell growth is typically based on an overpressure-induced expansion of the blowing agent in already formed or existing cells. As also mentioned, the cellular structure formed in this way, or the further expansion state realized with it, is permanently "frozen" or fixed by the or a temperature reduction of the cellular plastic particles produced in this way, i.e. by their cooling, e.g. in the environment.

Basically, after the pressurization in the second step of the method, i.e. after a pressure drop, in particular to normal or standard conditions, outgassing or desorption processes take place within the respective pre-expanded plastic material particles which are loaded with blowing agent and typically softened due to thermal conditions. The outgassing or desorption processes for the blowing agent represent an essential prerequisite for the cell growth processes and, if necessary, cell formation processes within respective plastic material particles required for the production of cellular plastic particles. From the pre-expanded plastic material particles present after the second step of the method, loaded with blowing agent and typically softened due to thermal conditions, the cellular plastic particles to be produced according to the method are formed in the third step of the method, in particular due to corresponding outgassing or desorption processes. As will be explained further on, cellular structures with locally different cell properties and thus graded cellular plastic particles can be realized, if necessary, by controlling the corresponding outgassing or desorption-related cell formation and cell growth processes.

Nucleation in conjunction with targeted adjustment of the softening behavior has a decisive influence on the desorption of the blowing agent. In particular, a large number of new small cells can be formed by a large number of individual nucleation points, resulting in a fine cell structure within the respective cellular plastic particles. A corresponding fine cell structure is characterized in particular by small cells and a largely homogeneous distribution of these within respective cellular plastic particles.

In general, cellular plastic particles with a cell size in the range between 0.5 and 250 μm can be produced. The actual cell size—of course an average is typically referred to here—can therefore be adjusted over a very wide range and thus tailored to the method, depending on the selected process conditions. The same applies to any distribution of cell sizes within the respective cellular plastic particles.

In particular, the method can be used to form cellular plastic particles with a (mean) cell size below 100 μm, in particular below 75 μm, further in particular below 50 μm, further in particular below 25 μm.

The third step S3 of the method can be carried out, optionally at least partially automated or partially automated, by means of an expansion device 4, which is configured for radiation-based expansion of the blowing agent for the production of cellular plastic particles at least under the influence of temperature for carrying out a corresponding radiation-based expansion process. A corresponding expansion device 4 is thus typically configured as a radiation-based heating device, i.e. generally as a temperature control device 4.1 comprising an at least radiation-based temperature-controllable or temperature-controlled temperature control or process chamber. A corresponding tempering device 4.1 can further comprise a conveyor device 4.3, which is configured for conveying the plastic material particles to be expanded along a conveying path through a corresponding tempering or process chamber. A corresponding expansion device 4 can in all cases comprise a control and/or regulation unit 4.2 implemented in terms of hardware and/or software, which is configured for controlling and/or regulating, i.e. generally for setting, certain dynamic and/or static conveying and/or temperature parameters within a corresponding tempering or process chamber.

The density of the cellular plastic particles produced in the third step S3 of the method is typically significantly below the initial density of the pre-expanded plastic material particles provided in the first step S1, resulting in the cellular properties of the plastic particles that can be produced or produced according to the method. The bulk density of the cellular plastic particles produced in the third step S3 of the method is correspondingly significantly below the bulk density of the pre-expanded plastic material particles provided in the first step S1 of the method.

The cellular plastic particles produced in the third step S3 of the method can be (further) expandable, as mentioned above; this can represent an essential property for the described, in particular steam-based or non-steam-based, further processing of the cellular plastic particles for the production of particle foam moldings.

As indicated, the loading of the pre-expanded plastic material particles with a blowing agent can be carried out under the influence of pressure and temperature. The parameters that can thus be varied for loading the pre-expanded plastic material particles with blowing agent and, subsequently, for the specific adjustment of certain properties of the cellular plastic particles to be produced or produced, in particular depending on the material, are thus initially the pressure and temperature conditions prevailing in the second step S2 of the method. Of course, the time, i.e. in particular the course and duration of the pressure and temperature conditions in the second step of the method, is also a parameter which has an influence on the loading of the pre-expanded plastic material particles with blowing agent, i.e. in particular the absorption or accumulation of the blowing agent in the pre-expanded plastic material particles.

The loading of the pre-expanded plastic material particles with the or a blowing agent can be carried out, for example, in particular depending on the chemical composition of the pre-expanded plastic material particles and/or the blowing agent, for example, at a pressure in a range between 1 and 200 bar. The pressure refers in particular to the pressure within a pressure or process chamber of a corresponding loading device 3 during the execution of the second step S2 of the method.

The loading of the pre-expanded plastic material particles with the or a blowing agent can be carried out, for example, in particular depending on the chemical composition of the pre-expanded plastic material particles and/or the blowing agent, for example, at a temperature in a range between 0 and 250° C. The temperatures refer in particular to temperatures within a pressure or process chamber of a corresponding loading device during the execution of the second step S2 of the method.

The loading of the pre-expanded plastic material particles with the blowing agent or a blowing agent can be carried out, for example, in particular depending on the chemical composition of the pre-expanded plastic material particles and/or the blowing agent, for a period of time, for example, in a range between 0.1 and 1000 hours. The above-mentioned, as mentioned, exemplary time durations refer in particular to the pressurization or temperature application of the plastic material particles within a pressure or process chamber of a corresponding loading device 2 during the execution of the second step S2 of the method.

Expanding the plastic material particles loaded with blowing agent to produce the cellular plastic particles under the influence of temperature, in particular depending on the chemical composition of the plastic particle material loaded with blowing agent and/or the blowing agent, can be carried out, for example, at normal pressure, i.e. an ambient pressure of about 1 bar. A special pressure level, such as a positive or negative pressure level, is therefore possible for expanding the pre-expanded plastic material particles loaded with blowing agent to produce the cellular plastic particles, but is not absolutely necessary, which fundamentally simplifies the expansion process. Expanding the plastic material particles loaded with blowing agent to produce the cellular plastic particles under the influence of temperature can be carried out, for example, in particular depending on the chemical composition of the plastic particle material loaded with blowing agent and/or the blowing agent, at a temperature, for example, in a range between 0 and 300° C. In particular, the above temperatures can refer to an inlet temperature when the pre-expanded plastic material particles loaded with blowing agent enter a corresponding expansion device 4 and/or to an outlet temperature when the cellular plastic particles exit a corresponding expansion device 4. Corresponding inlet and outlet temperatures can be the same, similar or different. Provided that a corresponding expansion device 4 comprises a conveyor device 4.31, which is arranged to convey the plastic material particles loaded with blowing agent along corresponding tempering devices 4.1, the aforementioned temperatures can refer to a temperature upon entry of the pre-expanded plastic particle material loaded with blowing agent into a corresponding expansion or temperature control device 4.1 (inlet temperature), thus to an initial area of a corresponding conveyor device 4.3, and/or to an outlet temperature when the plastic particles leave a corresponding expansion or temperature control device 4 (outlet temperature), thus to an end area of a corresponding conveyor device. Typically, the inlet temperature is lower than the outlet temperature.

The expansion of the pre-expanded plastic material particles loaded with blowing agent under the influence of temperature can be achieved by irradiating the pre-expanded plastic material particles loaded with blowing agent with high-energy thermal radiation, in particular infrared radiation. The temperature control, i.e. in particular the heating, of the pre-expanded plastic material particles loaded with blowing agent can be achieved, in particular depending on the material, by selecting and/or adjusting the properties of high-energy radiation, i.e. in particular its wavelength. This means that the properties of the energy-rich radiation, in particular its wavelength, can be selected and/or adjusted in a targeted manner without risking undesirable melting or through-melting, i.e. insufficient stability of the softened plastic material particles, in the event of softening of the pre-expanded plastic material particles loaded with blowing agent associated with heating. Investigations have shown that infrared radiation is particularly suitable for this purpose, as it enables targeted and, in conjunction with a conveyor device, easily controllable volume heating of the pre-expanded plastic material particles loaded with blowing agent, a controllable softening process and thus—this is essential for adjusting the properties of the cellular plastic particles to be produced—a controllable expansion process.

In particular, the expansion of the plastic material particles loaded with blowing agent can be effected under the influence of temperature by irradiating the pre-expanded plastic material particles loaded with a blowing agent with high-energy thermal radiation, in particular infrared radiation, wherein the plastic material particles loaded with blowing agent are conveyed on at least one conveying path defined by a conveyor device 4.3, in particular continuously, along at least one corresponding high-energy radiation, i.e. in particular infrared radiation, generating radiation generating device 4.4. A corresponding radiation generating device 4.4 can in particular be configured as or comprise an infrared oven, in particular a continuous infrared oven. A corresponding infrared oven can comprise one or more infrared emitters arranged or formed along a corresponding conveying path. Corresponding infrared emitters can, for example, have a radiation power, which can be variable, in a range between 1 and 500 kW. The above-mentioned powers can refer in particular to area power per $m^2$. In particular, area powers between 5 and 100 $kW/m^2$ can be used. Variable radiators or variable radiator (area) outputs can be used to generate different temperature zones, which also provides a parameter for influencing the expansion process.

According to the method, after the expansion of the plastic material particles loaded with blowing agent for the production of the cellular plastic particles, cooling of the produced cellular plastic particles can be carried out under the influence of a temperature (in particular lower than that of the previous expansion process), as indicated above. The cooling, which is expediently carried out rapidly, can result in a "freezing" of the cellular structure of the cellular plastic particles after the expansion process. In this way, further, integral or even only local expansion of the plastic particles, which can be undesirable after the expansion process, can be specifically prevented, for example in order to retain a cellular structure of the plastic particles which can be desired after the expansion process. In particular, cooling can be carried out from a process temperature above a reference temperature, in particular room temperature can be used as a reference temperature, to a cooling temperature below the method or reference temperature, in particular room temperature. Separate tempering devices for cooling the plastic particles are therefore not absolutely necessary, but it can be sufficient if the plastic particles are cooled to room temperature or aged at room temperature after the expansion process.

According to the method, as also indicated above, a pre-expanded plastic particle material containing at least one, in particular functional, additive or additive material, for example a fibrous substance or material and/or a dye or material and/or a nucleating substance or material and/or a substance or material for specifically influencing or controlling the softening behavior of the plastic material particles loaded with blowing agent, can be provided or used. Accordingly, compounded pre-expanded plastic material particles can also be loaded with blowing agent and expanded, resulting in cellular plastic particles with special properties. In particular, tailor-made plastic particles can be produced for specific applications or fields of application through a targeted selection and concentration of appropriate additives or materials. The additives or materials can have been introduced into the pre-expanded plastic material particles during their manufacture.

Particularly by means of fibrous substances or materials—which can basically be organic or inorganic fibrous substances or materials, e.g. aramid, glass, carbon or natural fibers—special material properties of the cellular plastic particles that can be or are produced according to the method or of a molded particle foam part produced from the cellular plastic particles that can be or are produced according to the method can be realized with regard to further processing. Corresponding cellular plastic particles or particle foam moldings produced from these can be characterized on the one hand by a special density due to their cellular structure and on the other hand in particular by special mechanical properties due to mechanical connections of adjacent cells within respective cellular plastic particles and/or between respective adjacent cellular plastic particles resulting from processing. During subsequent processing into particle foam moldings, these special mechanical properties can be utilized locally or integrally or can be further modified. The same applies—basically irrespective of their chemical composition—to non-fibrous or -shaped additives or additive materials, such as spherical or -shaped or platelet-like or -shaped organic and/or inorganic additives or additive materials.

In addition to specifically influencing the mechanical properties of the plastic particles, it is also possible, for example, to specifically influence the electrical properties and/or the thermal properties of the plastic particles by means of corresponding additives or materials. Thus, plastic particles with special electrically and/or thermally conductive properties can be produced, for example by using electrically and/or thermally conductive additives or materials such as metal and/or carbon black particles, etc.

The concentration of corresponding additives or additive materials can in principle be freely selected, although it typically depends on the material. Thus, it is merely indicated by way of example that pre-expanded plastic material particles with one (or more) additive(s) or additive material (s) can be provided or used in a (respective) concentration of between 0.01% by weight, this applies in particular to chemically active additives, and 60% by weight, this applies in particular to fibrous additives. As indicated, the concentration typically depends on the specific chemical and/or physical properties of the additives.

According to the method, basically any thermoplastic material can be provided or used as starting material. For example, pre-expanded plastic material particles from the group: Acrylonitrile-butadiene-styrene, Acrylonitrile-butadiene-styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polystyrene blend, polyvinyl chloride, thermoplastic elastomer blend. can be used. Blends or co-polymers or blends of different thermoplastic materials can also be used.

According to the method, depending on the selected process conditions, cellular plastic particles with a uniformly or non-uniformly distributed cellular structure can be produced, for example. The properties, i.e. in particular the distribution of the cellular structure, within the respective cellular plastic particles can therefore (also) be influenced by pressure, temperature and time during loading or expanding as well as by the conveying times or conditions between the individual method steps S1-S3, in addition to material-specific parameters.

If cellular plastic particles with an unevenly distributed cellular structure are produced according to the method, the respective cellular plastic particles can have a different number and/or shape and/or size of cells in a peripheral region than in a core region. Graded cellular plastic particles can therefore be produced which have a special range of properties due to the different distribution of cell number, cell shape and/or cell size. Graded cellular plastic particles can therefore, for example in the manner of core-shell particles, have different cellular properties in an (outer) peripheral region than in an (inner) core region.

In general, it is also true that, depending in particular on the degree of expansion and, where appropriate, the filler content, cellular plastic particles with a bulk density in a range between 5 and 1500 g/l can be produced by the method. The actual bulk density—here, too, of course, an average is typically referred to—can thus be adjusted over a very wide range and thus tailor-made, depending on the selected process conditions.

The embodiment example of an apparatus 1 for carrying out the method shown in FIG. 2 comprises the aforementioned supply device 2, the loading device 3, which is generally designable as a first device, which is configured for loading the pre-expanded thermoplastic with a blowing agent under the influence of pressure, and the expansion device 4, which is generally designable as a second device, which is configured for expanding the blowing agent for the production of cellular plastic particles under the influence of temperature.

The staging device 2 can comprise by a suitable handling device for handling the pre-expanded plastic material particles for staging them. In an analogous manner, although not shown, the apparatus 1 can comprise a handling device 5 downstream of the expansion device 4 for removing the produced cellular plastic particles. Corresponding handling devices can, as mentioned, be configured as or comprise conveyor devices. In particular, conveyor devices suitable for conveying bulk material, such as pneumatic conveyor devices, which are configured to form a conveying flow, can be considered.

As mentioned, the second device can comprise a conveyor device, in particular a combined conveying and temperature control device. A corresponding combined conveying and temperature control device can, for example, be configured as a continuous furnace, in particular as an infrared continuous furnace comprising one or more infrared emitters, or can comprise at least one such infrared continuous furnace.

The second device can also be assigned a stress-relieving device (not shown), such as a stress-relieving chamber, in which the manufactured cellular plastic particles are stored under defined chemical and/or physical conditions, i.e. in particular defined temperature ratios, for a defined time. A corresponding stress-relieving device can, for example, be configured as a decompression device or comprise such a device.

In all embodiment examples, it is conceivable that the device 1 comprises a conveyor device by means of which the pre-expanded plastic material particles or, further on, the cellular plastic particles are conveyed continuously or discontinuously through the individual devices 2-4.

FIG. 3 shows a principle representation of a cellular plastic particle produced according to the method in accordance with an embodiment example in a sectional view. Specifically, this is a section of a microscopic image of a foam bead made of pre-expanded polypropylene (EPP) with an initial bulk density of approx. 75 g/l of a cellular plastic particle produced according to the method with a reduced bulk density of approx. 17 g/l.

FIG. 4 shows a principle representation of a cellular plastic particle produced according to the method in accordance with an embodiment example. The principle illustration shows a cellular plastic particle with locally different cellular properties and thus a graded cellular plastic particle. Specifically, the cellular plastic particle has a non-uniformly distributed cellular structure than the plastic particle has a different number of cells in a peripheral region R, namely a higher number of cells than in a core region K. The dashed inner line indicates that the transitions between the peripheral region R and the core region K can be continuous. The peripheral region R can, if necessary, be locally different in intensity.

The invention claimed is:

1. A method for producing cellular plastic particles, comprising the steps:

providing a plastic material in the form of pre-expanded plastic material particles having a cellular structure, loading of the pre-expanded plastic material particles with a gaseous blowing agent under influence of pressure, wherein the blowing agent is a gas, expanding the pre-expanded plastic material particles loaded with the gaseous blowing agent for the production of cellular plastic particles with lower density, under influence of temperature, wherein the expanding of the pre-expanded plastic material particles loaded with the gaseous blowing agent under the influence of temperature is carried out by irradiating the pre-expanded plastic material particles loaded with the gaseous blowing agent with infrared radiation.

2. The method of claim 1, wherein the loading of the pre-expanded plastic material particles with the gaseous blowing agent is additionally carried out under the influence of temperature.

3. The method of claim 1, wherein the loading of the pre-expanded plastic material particles with the gaseous blowing agent is carried out at a pressure in a range between 1 and 200 bar.

4. The method of claim 2, wherein the loading of the pre-expanded plastic material particles with the gaseous blowing agent is carried out at a temperature in a range between 0 and 250° C.

5. The method of claim 1, wherein the loading of the pre-expanded plastic material particles with the gaseous blowing agent is carried out for a period of time in a range between 0.1 and 1000 h.

6. The method of claim 1, wherein the expanding of the plastic material particles loaded with the gaseous blowing agent is carried out under the influence of temperature at a temperature in a range between 2° and 300° C.

7. The method of claim 1, wherein the expanding of the pre-expanded plastic material particles loaded with the gaseous blowing agent takes place under the influence of temperature by irradiating the pre-expanded plastic material particles loaded with the gaseous blowing agent with the infrared radiation, wherein the pre-expanded plastic material particles loaded with the gaseous blowing agent are conveyed on at least one conveying path along at least one radiation generating device generating the infrared radiation.

8. The method of claim 1, wherein, after expanding the pre-expanded plastic material particles loaded with the gaseous blowing agent to produce the cellular plastic particles under the influence of temperature, cooling of the cellular plastic particles from a process temperature to a cooling temperature below the process temperature is carried out.

9. The method of claim 1, wherein pre-expanded plastic material particles containing at least one additive or additive material are provided or used.

10. The method of claim 9, wherein plastic material particles with at least one additive or additive material is provided or used in a concentration between 0.01 wt. % and 60 wt. %.

11. The method of claim 1, wherein pre-expanded plastic material particles selected from the group: Acrylonitrile butadiene styrene, Acrylonitrile butadiene styrene blend, Polyamide, Polyamide blend, Polycarbonate, Polycarbonate blend, Polyethylene, Polyethylene blend, Polypropylene, Polypropylene blend, Polyphenylene ether, Polyphenylene ether blend, thermoplastic elastomer, polyethylene terephthalate, polyethylene terephthalate blend, polybutylene terephthalate, polybutylene terephthalate blend, polystyrene, polystyrene blend, polyvinyl chloride, thermoplastic elastomer blend are provided or used.

12. The method of claim 1, wherein cellular plastic particles having a uniformly or non-uniformly distributed cellular structure are produced.

13. The method of claim 12, wherein cellular plastic particles having a non-uniformly distributed cellular structure within respective cellular plastic particles are produced, wherein respective cellular plastic particles in a peripheral region have a different number and/or size and/or shape of cells than in a core region.

14. The method of claim 1, wherein a combustible or non-combustible organic gas; or an inert gas; or nitrogen, carbon dioxide, or a mixture is used as the gaseous blowing agent.

15. The method of claim 1, wherein cellular plastic particles with a cell size in a range between 1 and 250 μm are produced.

16. The method of claim 1, wherein cellular plastic particles having a bulk density in a range between 5 and 1500 g/l are produced.

17. A plastic particulate material, which is formed by or comprises cellular plastic particles produced according to a method according to claim 1.

18. A method for processing a plastic particulate material of claim 17 to produce a three-dimensional object.

19. An apparatus for the production of cellular plastic particles of a method of claim 1, comprising:

a first device which is configured for loading pre-expanded plastic material particles having a cellular structure with a gaseous blowing agent under influence of pressure, wherein the device comprises a pressure vessel device; and a second device which is configured for expanding the gaseous blowing agent for the production of cellular plastic particles under influence of temperature, wherein the second device comprises a radiation generating device for generating infrared radiation.

20. The method of claim 1, wherein the gaseous blowing agent is air.

* * * * *